(12) United States Patent
Drott et al.

(10) Patent No.: US 7,997,075 B2
(45) Date of Patent: Aug. 16, 2011

(54) MASTER CYLINDER, ESPECIALLY FOR A CONTROLLED BRAKE SYSTEM

(75) Inventors: Peter Drott, Frankfurt (DE); Harald König, Ober-Mölen (DE); Udo Jungmann, Mörfelden (DE); Andreas Bischoff, Bad Vilbel (DE); Jörg Loke, Brechen (DE); Mathias Küster, Gifhorn (DE)

(73) Assignee: Continental Tevas AG & Co., Frankfurt (DE)

( * ) Notice: Subject to any disclaimer, the term of this patent is extended or adjusted under 35 U.S.C. 154(b) by 1014 days.

(21) Appl. No.: 10/584,804

(22) PCT Filed: Dec. 15, 2004

(86) PCT No.: PCT/EP2004/053516
§ 371 (c)(1),
(2), (4) Date: Jul. 16, 2007

(87) PCT Pub. No.: WO2005/066005
PCT Pub. Date: Jul. 21, 2005

(65) Prior Publication Data
US 2008/0022675 A1 Jan. 31, 2008

(30) Foreign Application Priority Data

Jan. 9, 2004 (DE) .......................... 10 2004 001 612
Nov. 26, 2004 (DE) .......................... 10 2004 057 137

(51) Int. Cl.
*B60T 8/38* (2006.01)
*B60T 11/16* (2006.01)
(52) U.S. Cl. ............................................. 60/588; 60/585
(58) Field of Classification Search .................... 60/568, 60/585, 586, 588, 589
See application file for complete search history.

(56) References Cited

U.S. PATENT DOCUMENTS

| | | | | |
|---|---|---|---|---|
| 5,878,575 A | * | 3/1999 | Kreh et al. ....................... | 60/588 |
| 7,055,322 B2 | * | 6/2006 | Yasuda et al. ................... | 60/588 |

FOREIGN PATENT DOCUMENTS

| | | |
|---|---|---|
| DE | 19520682 | 8/1996 |
| DE | 10120913 | 5/2002 |
| EP | 0807042 | 11/1997 |
| EP | 0918005 | 5/1999 |
| WO | 9623683 | 8/1996 |

* cited by examiner

Primary Examiner — Thomas E Lazo

(57) ABSTRACT

A master cylinder 1, especially for a controlled brake system, includes at least one piston 3, 4; 53, 54 displaceable in a housing 2, which is sealed in relation to a pressure chamber 7, 8 by means of a sealing element 5, 6 arranged in an annular groove 23, 24 of the housing 2, said pressure chamber being connectable to an unpressurized supply chamber 11, 12 by means of transverse bores 9, 10; 50, 51 provided in the piston 3, 4; 53, 54.
Several recesses 15, 16, 17 are arranged on an inside surface 13, 14; 59, 60 of the piston 3, 4; 53, 54 into which the transverse bores 9, 10; 50, 51 open.

12 Claims, 5 Drawing Sheets

B-B

C-C

MASTER CYLINDER, ESPECIALLY FOR A CONTROLLED BRAKE SYSTEM

BACKGROUND OF THE INVENTION

The invention relates to a master cylinder, especially for a controlled brake system, comprising at least one piston displaceable in a housing, which is sealed in relation to a pressure chamber by means of a sealing element arranged in an annular groove of the housing, said pressure chamber being connectable to an unpressurized supply chamber by means of transverse bores provided in the piston.

A master cylinder of this type is e.g. disclosed in DE 101 20 913 A1, and the transverse bores therein have a small cross-section in order to keep the lost travel of the master cylinder as short as possible. When used in a controlled brake system such as a brake system with traction slip control (TSC) or an Electronic Stability Program (ESP), a pump will replenish pressure fluid from a pressure fluid tank through the master cylinder in the case of control intervention. It is disadvantageous in the arrangement that the small cross-section of the transverse bores produces an excessive throttling resistance and the required pressure fluid of the pump cannot be provided at a sufficiently quick rate.

EP 0 807 042 A1 discloses designing the transverse bores as slots which extend in a circumferential direction of the piston. As an outside surface of the piston (peripheral surface) is used to guide the piston, it is necessary to debur the slots on the outside surface of the piston. To this end, suggestions have been made to arrange the slots in the bottom of a circumferential outside groove, necessitating also the circumferential outside groove to be machined in order to prevent sharp edges and damage to the sealing element. It is also disadvantageous that an inside sealing lip of the sealing element, when overriding the circumferential outside groove, is urged by a preload into the outside groove, which can also cause damage or torsion of the inside sealing lip.

In view of the above, an object of the invention is to provide a master cylinder, which is improved in this respect.

SUMMARY OF THE INVENTION

According to the invention, this object is achieved in that recesses are arranged on an inside surface of the piston into which the transverse bores open. This obviates the need for a sophisticated machining of the outside surface of the piston, on the one hand, while, on the other hand, the length of the transverse bores, i.e. the axial extension of the transverse bores, is reduced, whereby reduction of the throttling resistance is achieved. In addition, the lost travel of the master cylinder can be maintained small.

To simplify the producibility of the piston, the piston has on one side a substantially bowl-shaped wall with a first inside diameter and a second inside diameter, with the second inside diameter being larger than the first inside diameter, and with the transverse bores being arranged in a zone between the first and second inside diameters.

In a favorable improvement of the invention, the recesses are configured as a circumferential radial inside groove which can be produced with little effort. Finishing the inside groove is unnecessary. In addition, the piston can accommodate axial forces, which act on the piston when the piston strikes against the housing or the second piston, without any deformation because the wall thickness of the piston is not weakened.

Another favorable embodiment of the invention is achieved in that the recesses are configured as tooth interspaces of a toothed profile on the inside surface of the piston, with the recesses favorably extending in an axial direction until the end of the piston. It is thus possible to manufacture the piston with the recesses in a deep-drawing process, without needing any additional machining effort for making the recesses. In addition, the wall thickness of the piston is reduced only partly, with the result that the piston can accommodate the axial forces that develop without being deformed.

To ensure an especially simple manufacture of the transverse bores, opposite transverse bores have parallel boundary surfaces. This fact allows fabricating opposite transverse bores practically at the same time.

Preferably, the transverse bores have the shape of an oblong hole, whereby the throttling resistance can be reduced even further.

In a favorable embodiment of the invention, the transverse bores can be manufactured by shaping, e.g. by punching, or by displacing a drill in a radial direction relative to a longitudinal axis of the piston.

Tests have proven that a ratio of the value of roughly 1 is a favorable ratio of the length of bore relative to the diameter of bore or the length of bore relative to the width of the transverse bores, respectively.

The invention is explained in the following by way of the drawing showing embodiments.

DETAILED DESCRIPTION OF THE DRAWINGS

Figure 1:
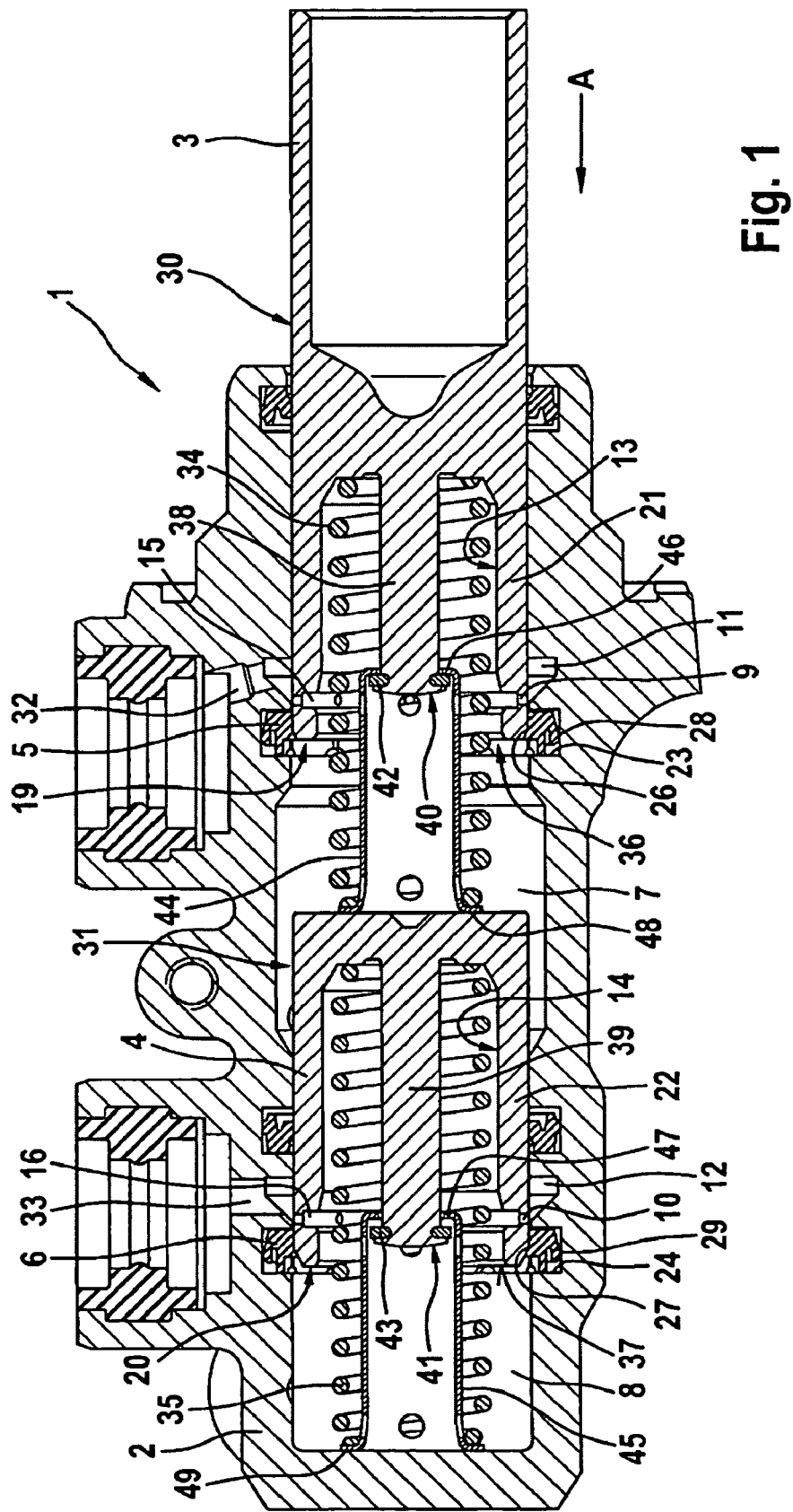
FIG. 1 is a longitudinal cross-sectional view of a first embodiment of a master cylinder of the invention.

FIG. 1 shows a longitudinal cross-sectional view of a first embodiment of a master cylinder 1 which is e.g. used in a controlled brake system with traction slip control (TCS) and/or Electronic Stability Program (ESP) and is designed in a plunger and tandem construction. The mode of function of a master cylinder 1 of this type is principally known so that only the features, which are essential to the invention, are mainly described.

The master cylinder 1 comprises a first and a second piston 3, 4 being displaceable in a housing 2, and an annular groove 23, 24 of the housing 2 accommodates a circular sealing element 5, 6 with a dynamically applied inside sealing lip 26, 27 and a statically applied outside sealing lip 28, 29. The dynamically applied inside sealing lip 26, 27 bears with a first sealing surface against the piston 3, 4, while the statically applied outside sealing lip 28, 29 bears with a second sealing surface against a bottom of the annular groove 23, 24. An outside surface 30, 31 of the pistons 3, 4 serves as a guiding surface.

In an inactive state of the master cylinder 1 as shown in FIG. 1, a first and a second pressure chamber 7, 8 connect to an unpressurized pressure fluid tank (not shown) by way of a pressure fluid channel 32, 33 and a supply chamber 11, 12 in the housing 2 as well as by way of transverse bores 9, 10 in a bowl-shaped wall 21, 22, which is provided at a side 36, 37 of the first and the second piston 3, 4. Depending on the type of design of the master cylinder 1, a number of four to twenty-four transverse bores 9, 10 are arranged in an evenly distributed way at the periphery of the piston 3. Pistons 3, 4 are preloaded by means of compression springs 34, 35.

The compression spring 34, 35 is arranged, at least in part, inside the bowl-shaped wall 21, 22. A centric pin 38, 39, which ends before its axial exit from wall 21, 22 penetrates wall 21, 22 centrally. End 40, 41 includes a stop 42, 43 for a sleeve 44, 45 cooperating with a collar 46, 47 in such a fashion that sleeve 44, 45 is adapted to be telescoped within limits in relation to the pin 38, 39. More specifically, sleeve 44, 45 with the compression spring 34, 35 is urged into the interior of the piston during actuation. As can be seen, stop 42, 43 preferably is an annular disc, which is riveted, especially wobble-riveted, to pin 38, 39. The other end of the sleeve 44, 45 comprises the plate-like collar 48, 49 for abutment of the compression spring 34, 35.

The first piston 3 displaces in the actuating direction A for actuating the master cylinder 1. As this occurs, the movement of the first piston 3 is transmitted onto the second piston 4 by way of the compression spring 34. As soon as the transverse bores 9, 10 are in the zone of the sealing elements 5, 6, the so-called lost travel of the master cylinder 1 is covered because pressure fluid can no longer propagate from the supply chambers 11, 12 through the transverse bores 9, 10 into the pressure chambers 7, 8. The connection between the pressure chambers 7, 8 and the pressure fluid tank is interrupted, and pressure develops in the pressure chambers 7, 8.

The two serially arranged pistons 3, 4 of the master cylinder 1 are almost identical in their design and their mode of function so that only the first piston 3 will be described further.

It can be necessary in a TCS or ESP intervention, when the piston 3 is in the non-active or active state, to aspirate pressure fluid from the pressure fluid tank through the pressure chamber 7 in the direction of the wheel brakes, what is preferably executed by means of a pump, the inlet of which can be connected optionally to the pressure chambers 7, 8 of the master cylinder 1 or to the wheel brakes in order to deliver fluid in the direction of the wheel brakes or in the direction of the master cylinder 1 (return principle). In the event of TCS intervention, in the inactive state of the master cylinder 1, pressure fluid is aspirated from the pressure fluid tank through the pressure fluid channel 32, the supply chamber 11, the transverse bores 9, and the pressure chamber 7. In the event of ESP intervention in the active state of the master cylinder 1, replenishment takes place additionally by fluid flowing over the outside sealing lip 28 of the sealing element 5, as the lip tilts over in the direction of the inside sealing lip 26 due to the suction pressure and, as a result, the sealing surface of the outside sealing lip 28 no longer bears against the bottom of the annular groove 23. In order to provide the pump quickly with sufficient pressure fluid in the event of a TCS or ESP intervention, in particular in the inactive position of the master cylinder 1, it is necessary to keep the throttling resistance of the transverse bores 9 as low as possible. However, also the lost travel of the master cylinder 1 shall be minimized to the greatest extent possible.

Figure 2:
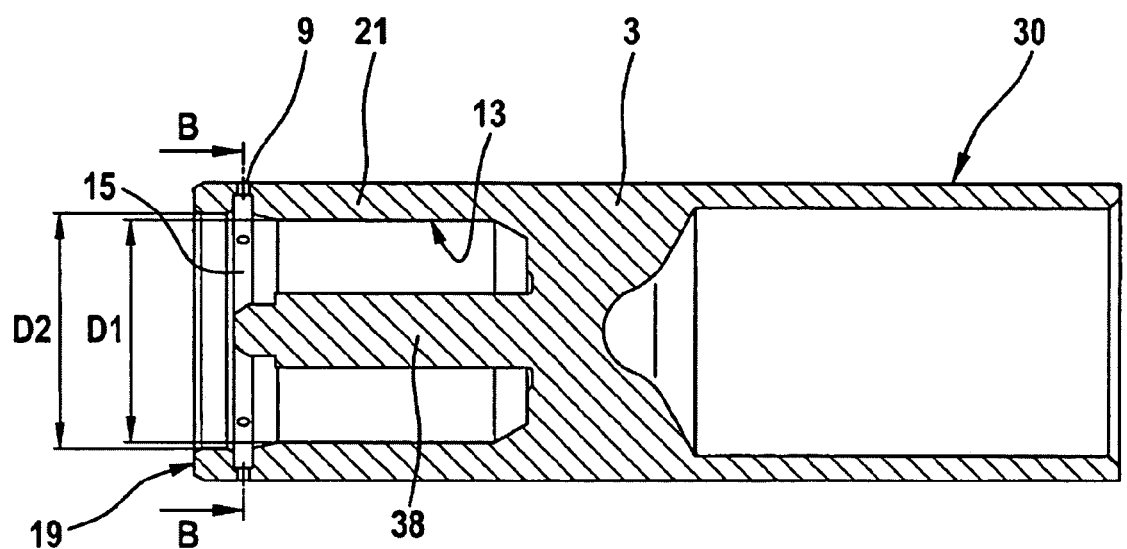
FIG. 2 is a longitudinal cross-sectional view of a first piston of the first embodiment of a master cylinder of the invention.
Figure 3:
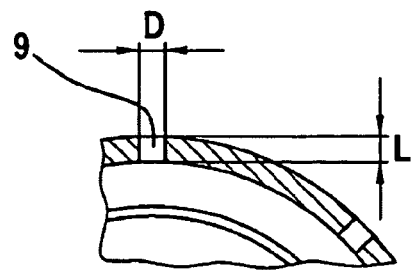
FIG. 3 is a partial view of the piston of FIG. 2 in a cross-section taken along the line B-B in FIG. 2.

FIG. 2 shows the first piston 3 of the first embodiment in a longitudinal cross-section, and FIG. 3 shows a partial view of the piston 3 in a cross-section taken along line B-B in FIG. 2.

As can be seen in FIG. 2, the piston 3 has a substantially bowl-shaped design at side 36 and a first inside diameter D1 and a second inside diameter D2, with the second inside diameter D2 being larger than the first inside diameter D1, whereby manufacture of piston 3 is simplified. The transverse bores 9 are evenly distributed at the periphery of piston 3 in a zone between the two inside diameters D1, D2 and open into recesses 15 which are provided on an inside surface 13 of piston 3. As can be seen in FIG. 2 in particular, the recesses 15 are designed as a circumferential radial inside groove.

As the wall thickness of the bowl-shaped wall 21 is not weakened at end 19, the piston 3 can accommodate axial forces without deformation, the forces acting on it when the piston 3 strikes against the second piston 4. Abutment of the piston 3 will occur, for example, in a case of circuit failure.

As can be taken from FIG. 3, the transverse bores 9 have a diameter of bore D and a length of bore L, and the ratio of length of bore L and diameter of bore D has a value of roughly 1, which has proven to be especially favorable. The inside groove 15 thus reduces the length of bore L and, hence, the throttling resistance of the transverse bores 9.

Figure 4:
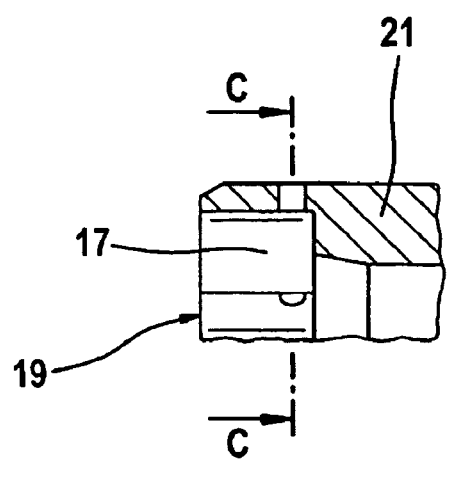
FIG. 4 is a partial view of a first piston of a second embodiment in a longitudinal cross-section.
Figure 5:
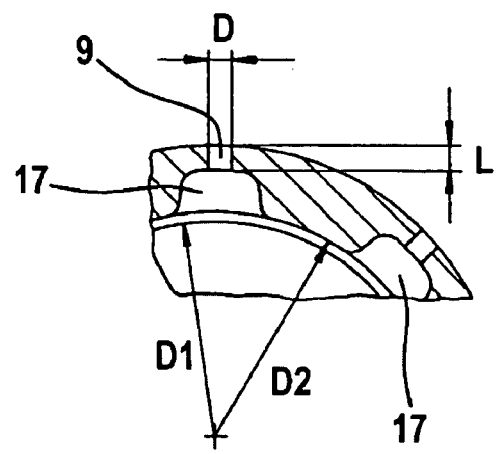
FIG. 5 is a partial view of the piston of FIG. 4 in a cross-section taken along the line C-C in FIG. 4.
Figure 6:
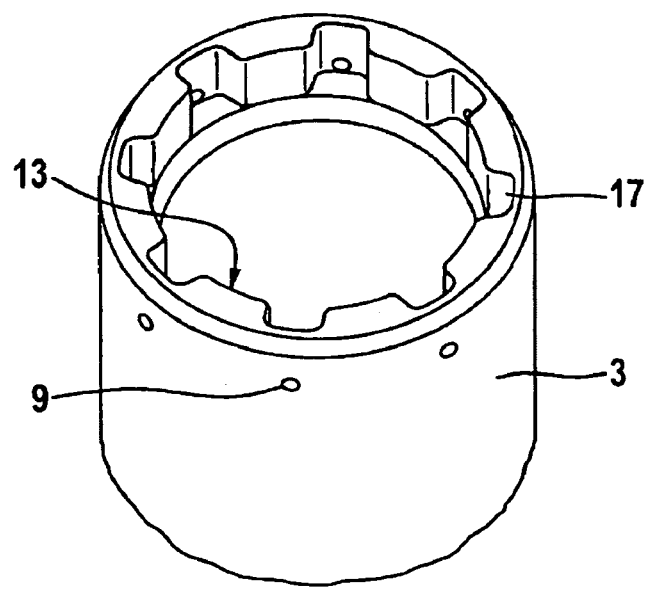
FIG. 6 is a partial perspective view of the piston of FIG. 4.

FIGS. 4 to 6 show in partial views and cross-sections a first piston 3 of a second embodiment of a master cylinder 1, which largely corresponds to the embodiment of FIGS. 1 to 3, so that features that correspond to each other have been assigned like reference numerals and there will be no repetition of related parts of description. Therefore, reference is made exclusively to the basic differences in the following.

It becomes apparent especially from FIG. 5, which shows a cross-section along the line C-C in FIG. 4, and from FIG. 6 that the transverse bores 9 open into recesses 17 which are configured as tooth interspaces of a toothed profile on the inside surface 13 of the piston 3. The recesses 17 extend in an axial direction until the end 19 of the piston 3, whereby manufacture by means of deepdrawing the piston 3 is permitted, and the recesses 17 can be manufactured without additional machining step.

In this embodiment, the wall thickness of the bowl-shaped wall 21 at the end 19 is weakened only in part, with the result that the piston 3 can accommodate axial forces without deformation also in this case.

Figure 7:
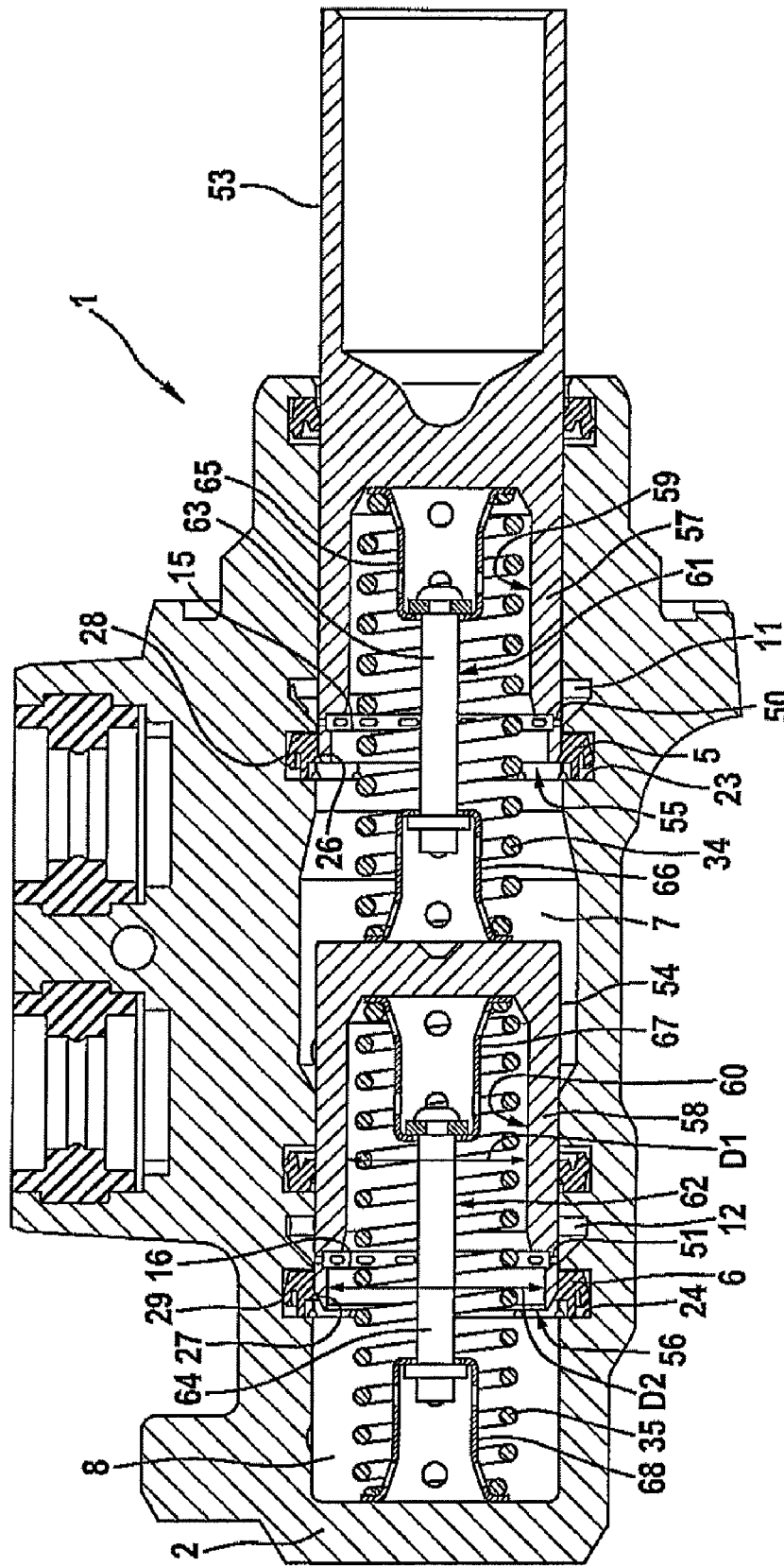
FIG. 7 is a longitudinal cross-sectional view of a third embodiment of a master cylinder of the invention.
Figure 9:
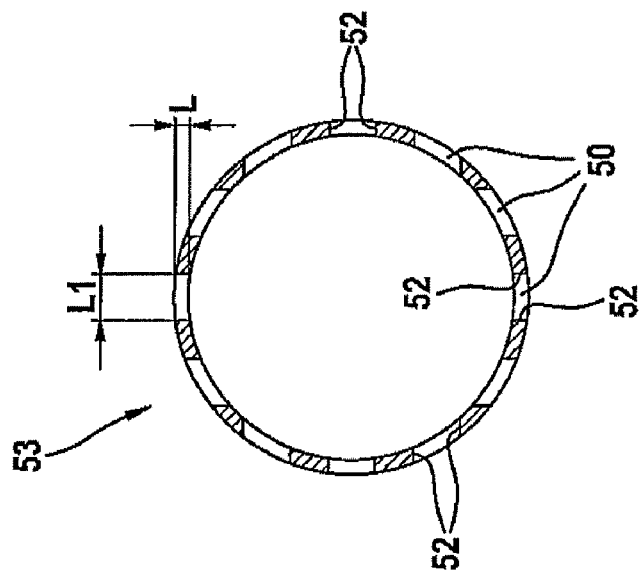
FIG. 9 is a partial view of the piston of FIG. 8 in a cross-section in the zone of the transverse bores.
Figure 8:
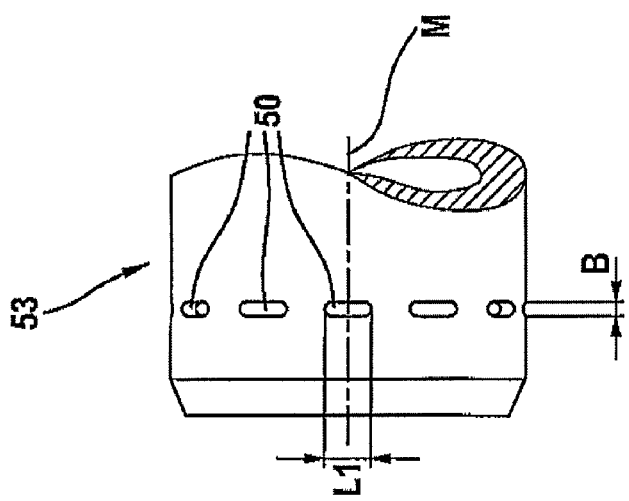
FIG. 8 is a partial view of a first piston of the third embodiment of a master cylinder of the invention.

FIGS. 7 to 9 show partial cross-sectional views of a third embodiment of a master cylinder 1, which largely corresponds to the two above-described embodiments according to FIGS. 1 to 6, so that features that correspond to each other have been assigned like reference numerals and there will be no repetition of related parts of description. Therefore, reference is made exclusively to the basic differences in the following.

The master cylinder 1 of the third embodiment comprises a first and a second piston 53, 54 displaceable in the housing 2 and having a substantially bowl-shaped wall 57, 58 on one side 55, 56.

Compared to the first two embodiments, the master cylinder 1 of the third embodiment includes spring assemblies 61, 62 used to preload the pistons 53, 54. The spring assemblies 61, 62 respectively comprise the compression spring 34, 35, a dowel pin 63, 64, as well as two tensioning sleeves 65, 66, 67, 68 in each case, with the result that a centrically arranged pin that is illustrated in FIG. 1 becomes unnecessary. It is thereby possible to manufacture the pistons 53, 54 in a relatively simple fashion as plastic parts or as metallic turned parts.

In the bowl-shaped wall 57, 58, the pistons 53, 54 include transverse bores 50, 51 which are arranged at the periphery of the pistons 53, 54 evenly distributed in a zone between the two inside diameters D1, D2, and which open into recesses 15, 16 provided on an inside surface 59, 60 of the pistons 53, 54. The recesses 15, 16 are configured as a circumferential radial inside groove like according to the embodiment of FIG. 2.

The two serially arranged pistons 53, 54 of the master cylinder 1 are almost identical in their design and mode of function so that only the first piston 53 will be described in detail.

As can be seen in FIG. 8, which is a partial view of the first piston 53, the transverse bores 50 have the shape of an oblong hole with a length L1 and a width B. Designing the transverse bores 50 as oblong holes is advantageous because the throttling resistance can thus be further reduced.

In particular FIG. 9, which is a partial cross-sectional view of the second piston 53 in the zone of the transverse bores, makes it clear that the transverse bores 50 have a length of bore L. The ratio of length of bore L to width B has a value of roughly 1, which has proven to be especially favorable. The inside groove 15 hence reduces the length of bore L and, thus, the throttling resistance of the transverse bores 50.

It can further be seen that opposite transverse bores 50 have parallel boundaries 52, and the transverse bores 50 can be manufactured e.g. by shaping, e.g. by punching, or by displacing a drill in a radial direction relative to the longitudinal axis M of the piston 53.

LIST OF REFERENCE NUMERALS 1 master cylinder
2 housing
3 piston
4 piston
5 sealing element
6 sealing element
7 pressure chamber
8 pressure chamber
9 transverse bore
10 transverse bore
11 supply chamber
12 supply chamber
13 inside surface
14 inside surface
15 recess
16 recess
17 recess
19 end
20 end
21 wall
22 wall
23 annular groove
24 annular groove
26 inside sealing lip
27 inside sealing lip
28 outside sealing lip
29 outside sealing lip
30 outside surface
31 outside surface
32 pressure fluid channel
33 pressure fluid channel
34 compression spring
35 compression spring
36 side
37 side
38 pin
39 pin
40 end
41 end
42 stop
43 stop
44 sleeve
45 sleeve
46 collar
47 collar
48 collar
49 collar
50 transverse bore
51 transverse bore
52 reference surface
53 piston
54 piston
55 side
56 side
57 wall
58 wall
59 inside surface
60 inside surface
61 spring assembly
62 spring assembly
63 dowel pin
64 dowel pin
65 tensioning sleeve
66 tensioning sleeve
67 tensioning sleeve
68 tensioning sleeve
A actuating direction
D diameter of bore
D1 diameter
D2 diameter
B width
L length of bore
L1 length
M longitudinal axis

The invention claimed is:

1. A master cylinder (1) for a controlled brake system, comprising a housing, at least one piston (3, 4; 53, 54) displaceable in the housing (2) and sealed from a pressure chamber (7, 8) by means of a sealing element (5, 6) arranged in an annular groove (23, 24) of the housing (2), said pressure chamber being connectable to an unpressurized supply chamber (11, 12) by means of transverse bores (9, 10; 50, 51) provided in the piston (3, 4; 53, 54),
wherein recesses (15, 16, 17) are arranged on an inside surface (13, 14) of the piston (3, 4; 53, 54) into which the transverse bores (9, 10) open.

2. The master cylinder as claimed in claim 1,
wherein the piston (3, 4; 53, 54) has on one side (36, 37; 55, 56) a substantially bowl-shaped wall (21, 22; 57, 58) with a first inside diameter (D1) and a second inside diameter (D2), with the second inside diameter (D2) being larger than the first inside diameter (D1), and in that the transverse bores (9, 10; 50, 51) are arranged in a zone between the first and second inside diameters (D1, D2).

3. The master cylinder as claimed in claim 2,
wherein the recesses (15, 16) are configured as a circumferential radial inside groove.

4. The master cylinder as claimed in claim 2,
wherein the recesses (17) are configured as tooth interspaces of a toothed profile on the inside surface (13, 14) of the piston (3, 4).

5. The master cylinder as claimed in claim 4,
wherein the recesses (17) extend in an axial direction until an end (19, 20) of the piston (3, 4).

6. The master cylinder as claimed in claim 1,
wherein the transverse bores (9, 10) have a length of bore (L) and a diameter of bore (D), and the ratio of the length of bore (L) relative to the diameter of bore (D) is approximately equal to 1.

7. The master cylinder as claimed in claim 1,
wherein opposite transverse bores (50, 51) have parallel boundary surfaces (52).

8. The master cylinder as claimed in claim 7,
wherein the transverse bores (50, 51) have the shape of an oblong hole.

9. The master cylinder as claimed in claim 8,
wherein the transverse bores (50, 51) are manufactured by shaping.

10. The master cylinder as claimed in claim 8,
wherein the transverse bores (50, 51) can be manufactured by drilling radial direction relative to a longitudinal axis (M) of the piston (53, 54).

11. The master cylinder as claimed in claim 9,
wherein the transverse bores (50, 51) have a length of bore (L), a length (L1) and a width (B), and the ratio of length of bore (L) to width (B) is approximately equal to 1.

12. The master cylinder as claimed claim 1,
wherein between four and twenty-four transverse bores (9, 10; 50, 51) are evenly distributed around the periphery of the piston (3, 4; 53, 54).

* * * * *